(12) United States Patent
Padilla et al.

(10) Patent No.: US 12,437,596 B2
(45) Date of Patent: *Oct. 7, 2025

(54) METHODS AND DEVICES FOR PHYSICAL ACCESS CONTROL SYSTEMS

(71) Applicant: ASSA ABLOY AB, Stockholm (SE)

(72) Inventors: Toby Mark Padilla, Lakewood, CO (US); Nathan Stevens, Denver, CO (US); Tom Edward Stephens, Westminster, CO (US); Masha Leah Davis, Austin, TX (US)

(73) Assignee: ASSA ABLOY AB, Stockholm (SE)

( * ) Notice: Subject to any disclaimer, the term of this patent is extended or adjusted under 35 U.S.C. 154(b) by 47 days.

This patent is subject to a terminal disclaimer.

(21) Appl. No.: 18/049,049

(22) Filed: Oct. 24, 2022

(65) Prior Publication Data

US 2023/0075974 A1 Mar. 9, 2023

Related U.S. Application Data

(63) Continuation of application No. 17/130,891, filed on Dec. 22, 2020, now Pat. No. 11,514,741, which is a
(Continued)

(51) Int. Cl.
*G07C 9/28* (2020.01)
*G07C 9/00* (2020.01)
(Continued)

(52) U.S. Cl.
CPC .......... *G07C 9/28* (2020.01); *G07C 9/00571* (2013.01); *G07C 9/00904* (2013.01);
(Continued)

(58) Field of Classification Search
CPC .. G07C 9/28; G07C 9/00571; G07C 9/00904; G07C 2009/00769; G07C 9/00174;
(Continued)

(56) References Cited

U.S. PATENT DOCUMENTS 7,289,764 B2 * 10/2007 Gonzales ................. G07C 9/27
340/426.25
8,489,513 B2 7/2013 Bishop et al.
(Continued)

FOREIGN PATENT DOCUMENTS

GB 2478128 A 8/2011
WO WO-2016177671 A1 11/2016
WO WO-2018109564 A1 6/2018

OTHER PUBLICATIONS

"U.S. Appl. No. 16/468,903, Advisory Action mailed Oct. 1, 2020", 3 pgs.
(Continued)

*Primary Examiner* — Nam V Nguyen
(74) *Attorney, Agent, or Firm* — Schwegman Lundberg & Woessner, P.A.

(57) ABSTRACT

An access control system includes a plurality of physical access control readers that form a reader network which utilizes a first communication protocol. The system includes a plurality of mobile communication devices each having a first communication interface and a second communication interface. The first communication interface enables the mobile communication devices to access a mobile communication network which utilizes a second communication protocol, and the second communication interlace enables the mobile communication devices to communicate with the access control readers. The plurality of physical access control readers exchange status information for the plurality of physical access control readers and for the plurality of mobile communication devices over the reader network.

24 Claims, 6 Drawing Sheets

Related U.S. Application Data continuation of application No. 16/468,903, filed as application No. PCT/IB2017/001717 on Dec. 18, 2017, now Pat. No. 10,909,791.

(60) Provisional application No. 62/435,502, filed on Dec. 16, 2016.

(51) Int. Cl.
*H04W 4/029* (2018.01)
*H04W 12/30* (2021.01)
*H04W 12/63* (2021.01)

(52) U.S. Cl.
CPC ........... *H04W 4/029* (2018.02); *H04W 12/30* (2021.01); *H04W 12/63* (2021.01)

(58) Field of Classification Search
CPC ..... H04W 4/029; H04W 12/30; H04W 12/63; G08B 27/00; H04L 63/00
USPC ........................................................ 340/5.61
See application file for complete search history.

(56) References Cited

U.S. PATENT DOCUMENTS

| | | | |
|---|---|---|---|
| 8,578,472 B2 | 11/2013 | Davis et al. | |
| 9,076,273 B2* | 7/2015 | Smith | G07C 9/00309 |
| 9,092,016 B2 | 7/2015 | Mcgeachie | |
| 9,182,748 B2* | 11/2015 | Herscovitch | G07F 7/0873 |
| 9,195,866 B1 | 11/2015 | Mehranfar et al. | |
| 9,292,985 B2* | 3/2016 | Ahearn | G07C 9/00571 |
| 9,312,926 B2* | 4/2016 | Neafsey | H04L 63/0428 |
| 9,443,362 B2 | 9/2016 | Singh | |
| 9,591,693 B2* | 3/2017 | Stroud | H04B 5/79 |
| 9,792,744 B2* | 10/2017 | Telljohann | H04B 7/0811 |
| 9,852,557 B2* | 12/2017 | Selinder | G07C 9/28 |
| 10,158,550 B2* | 12/2018 | Trani | H04B 7/04 |
| 10,184,284 B2* | 1/2019 | Baumgarte | G01B 7/003 |
| 10,192,383 B2* | 1/2019 | Aase | G07C 9/00857 |
| 10,257,190 B2* | 4/2019 | Baty | H04W 12/04 |
| 10,909,791 B2 | 2/2021 | Padilla et al. | |
| 11,405,784 B2* | 8/2022 | Pirch | H04W 12/06 |
| 11,514,741 B2* | 11/2022 | Padilla | G07C 9/00571 |
| 2006/0022800 A1 | 2/2006 | Krishna et al. | |
| 2006/0082444 A1 | 4/2006 | Sweeney et al. | |
| 2006/0136717 A1* | 6/2006 | Buer | H04L 63/0853 |
| | | | 713/155 |
| 2006/0224901 A1 | 10/2006 | Lowe | |
| 2007/0103303 A1 | 5/2007 | Shoarinejad | |
| 2007/0290793 A1 | 12/2007 | Tran | |
| 2008/0001734 A1 | 1/2008 | Stilp et al. | |
| 2008/0041943 A1 | 2/2008 | Radicella et al. | |
| 2008/0297312 A1 | 12/2008 | Moshfeghi | |
| 2009/0138353 A1 | 5/2009 | Mendelson | |
| 2011/0291803 A1 | 12/2011 | Bajic et al. | |
| 2011/0311052 A1 | 12/2011 | Myers et al. | |
| 2012/0280783 A1 | 11/2012 | Gerhardt et al. | |
| 2013/0162399 A1 | 6/2013 | Flammer, III | |
| 2014/0333412 A1 | 11/2014 | Lewis et al. | |
| 2015/0223066 A1 | 8/2015 | Lowe | |
| 2016/0005248 A1 | 1/2016 | Aase | |
| 2016/0364927 A1 | 12/2016 | Barry et al. | |
| 2017/0220985 A1 | 8/2017 | White et al. | |
| 2019/0318561 A1 | 10/2019 | Padilla et al. | |
| 2021/0183191 A1 | 6/2021 | Padilla et al. | |
| 2023/0063631 A1 | 3/2023 | Padilla et al. | |

OTHER PUBLICATIONS

"U.S. Appl. No. 16/468,903, Final Office Action mailed Jul. 22, 2020", 24 pgs.
"U.S. Appl. No. 16/468,903, Non Final Office Action mailed Mar. 5, 2020", 17 pgs.
"U.S. Appl. No. 16/468,903, Notice of Allowance mailed Oct. 29, 2020", 5 pgs.
"U.S. Appl. No. 16/468,903, Preliminary Amendment filed Jun. 12, 2019", 4 pgs.
"U.S. Appl. No. 16/468,903, Response filed Jun. 5, 2020 to Non Final Office Action mailed Mar. 5, 2020", 14 pgs.
"U.S. Appl. No. 16/468,903, Response filed Sep. 21, 2020 to Final Office Action mailed Jul. 22, 2020", 11 pgs.
"U.S. Appl. No. 17/130,891, Final Office Action mailed May 2, 2022", 30 pgs.
"U.S. Appl. No. 17/130,891, Non Final Office Action mailed Jan. 21, 2022", 24 pgs.
"U.S. Appl. No. 17/130,891, Notice of Allowance mailed Aug. 10, 2022", 5 pgs.
"U.S. Appl. No. 17/130,891, Preliminary Amendment Filed Mar. 5, 2021", 8 pgs.
"U.S. Appl. No. 17/130,891, Response filed Mar. 28, 2022 to Non Final Office Action mailed Jan. 21, 2022", 11 pgs.
"U.S. Appl. No. 17/130,891, Response filed Jun. 30, 2022 to Final Office Action mailed May 2, 2022", 12 pgs.
"International Application Serial No. PCT/IB2017/001717, International Preliminary Report on Patentability mailed Jun. 27, 2019", 8 pgs.
"International Application Serial No. PCT/IB2017/001717, International Search Report mailed Apr. 3, 2018", 4 pgs.
"International Application Serial No. PCT/IB2017/001717, Written Opinion mailed Apr. 3, 2018", 6 pgs.
"U.S. Appl. No. 18/049,040, Non Final Office Action mailed Mar. 21, 2024", 21 pgs.
"U.S. Appl. No. 18/049,040, Response filed Jul. 22, 2024 to Non Final Office Action mailed Mar. 21, 2024", 11 pgs.
"U.S. Appl. No. 18/049,040, Final Office Action mailed Oct. 21, 2024", 25 pgs.
"U.S. Appl. No. 18/049,040, Response filed Dec. 20, 2024 to Final Office Action mailed Oct. 21, 2024", 9 pgs.
"U.S. Appl. No. 18/049,040, Advisory Action mailed Jan. 21, 2025", 3 pgs.
"U.S. Appl. No. 18/049,040, Corrected Notice of Allowability mailed May 14, 2025", 2 pgs.
"U.S. Appl. No. 18/049,040, Notice of Allowance mailed Feb. 12, 2025", 9 pgs.
"U.S. Appl. No. 18/049,040, Supplemental Notice of Allowability mailed Feb. 24, 2025", 2 pgs.

\* cited by examiner

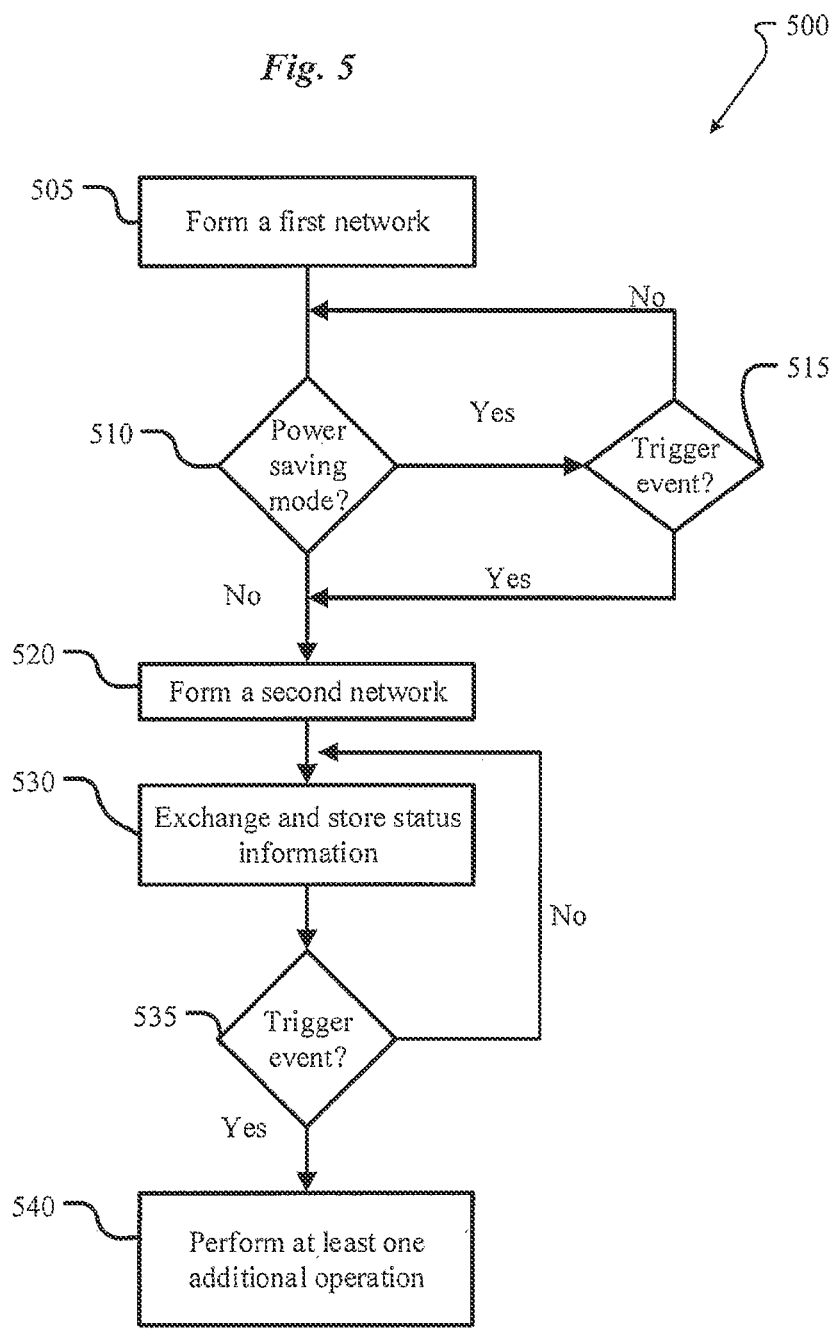

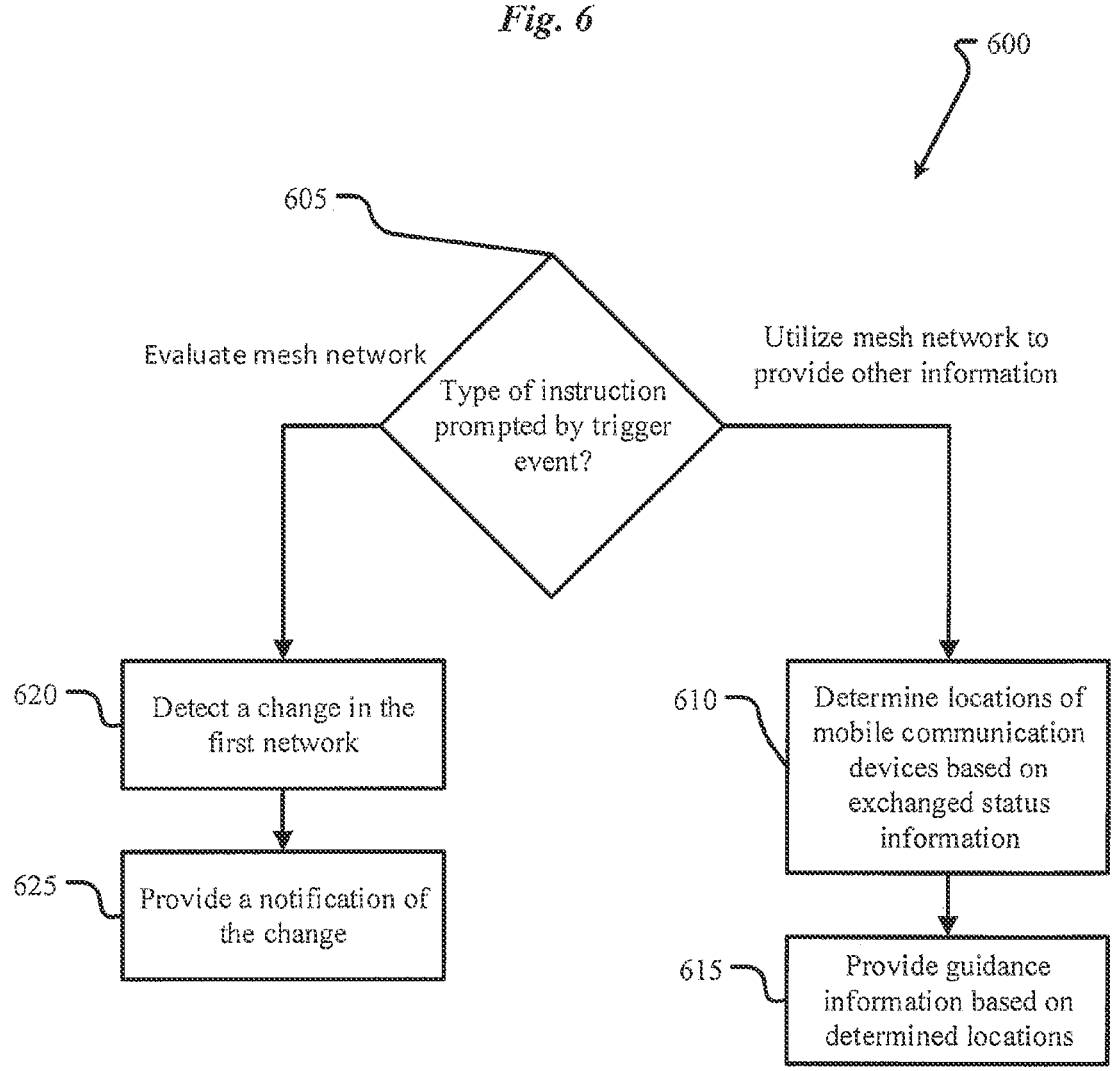

METHODS AND DEVICES FOR PHYSICAL ACCESS CONTROL SYSTEMS

CROSS-REFERENCE TO RELATED APPLICATIONS

This application is a continuation of U.S. application Ser. No. 17/130,891, titled "Methods and Devices for Physical Access Control Systems," filed Dec. 22, 2020, now U.S. Pat. No. 11,514,741, which is a continuation of U.S. application Ser. No. 16/468,903, titled "Methods and Devices for Physical Access Control Systems," filed Jun. 12, 2019, now U.S. Pat. No. 10,909,791, which is a national stage application of International PCT Patent Application No. PCT/IB2017/001717, titled "Methods and Devices for Physical Access Control Systems," filed Dec. 18, 2017, which claims the benefit of U.S. Provisional Patent Application No. 62/435,502, filed on Dec. 16, 2016, each of which is hereby incorporated herein by reference in its entirety.

FIELD OF THE DISCLOSURE

The present disclosure is generally directed toward a physical access control system and methods and devices for operating the same.

BACKGROUND

Radio Frequency Identification (RFID) technology is used in a variety of applications including physical access control systems (e.g., contactless physical access control systems). Such physical access control systems usually include RFID readers that wirelessly communicate with RFID tags (or credentials) according to a communications protocol to allow or to deny access to a secured area such as a building, a room, etc. In some cases, the reader is connected to a control panel that assists the reader in making access control decisions.

SUMMARY

Example embodiments include an access control system comprising a plurality of physical access control readers that form a reader network which utilizes a first communication protocol. The system includes a plurality of mobile communication devices each having a first communication interface and a second communication interface. The first communication interface enables the mobile communication devices to access a mobile communication network which utilizes a second communication protocol. The second communication interface enables the mobile communication devices to communicate with the access control readers. The plurality of physical access control readers exchange status information for the plurality of physical access control readers and for the plurality of mobile communication devices over the reader network.

According to at least one example embodiment, the second communication interface utilizes a third communication protocol.

According to at least one example embodiment, the second communication interface is one of a Bluetooth Low Energy (BLE) interface, a WiFi interface, a near field communication (NFC) interface, and a Zigbee interface.

According to at least one example embodiment, each of the plurality of physical access control readers includes a memory to store the status information.

According to at least one example embodiment, the status information includes first information regarding a physical location of each mobile communication device relative to locations the physical access controller readers in the reader network.

According to at least one example embodiment, the status information includes second information to identify active and inactive physical access control readers in the reader network and their current condition. The status information includes third information to identify which of the plurality of mobile communication devices are currently connected to the reader network.

According to at least one example embodiment, the memory stores the first, second, and third information in respective logs.

According to at least one example embodiment, the memory stores guidance information, and, in response to an emergency event, the reader network sends the guidance information to the plurality of mobile communication devices.

According to at least one example embodiment, a method for an access control system includes forming a first network that enables communication between a plurality of physical access control readers. The method includes forming a second network that enables communication between the plurality of physical access control readers and a plurality of mobile communication devices. The method includes exchanging, over the first network, status information for the plurality of physical access control readers and for the plurality of mobile communication devices.

According to at least one example embodiment, the forming the second network occurs in response to an emergency event.

According to at least one example embodiment, the method further includes determining, by one or more of the plurality of physical access control readers, locations of the mobile communication devices relative the one or more of the plurality of physical access control readers based on the exchanged status information. The method includes providing, over the second network, guidance information to one or more of the plurality of mobile communication devices based on the determined locations.

According to at least one example embodiment, the guidance information includes at least one of audio and video relating to a premises in which the plurality of physical access control readers are located.

According to at least one example embodiment, the video includes a map that updates in real time to show a location of the one or more of the plurality of mobile communication devices within the premises.

According to at least one example embodiment, the method further comprises detecting a change in a number of the plurality of physical access control readers that are in the first network. The method includes providing a notification of the change to one or more of the plurality of mobile communication devices. The notification includes information to identify where the detected change occurred within the first network.

According to at least one example embodiment, the status information includes at least one of: one or more first quantities sensed by one or more of the plurality of physical access control readers, and one or more second quantities sensed by one or more of the plurality of mobile communication devices.

According to at least one example embodiment, the one or more first quantities and the one or more second quantities each include at least one of temperature information, air quality information, access information, and pressure information.

According to at least one example embodiment, the method further comprises storing the status information on at least one of the plurality of physical access control readers and on at least one of the plurality of mobile communication devices.

According to at least one example embodiment, a device includes a first interface to communicate with first devices according to a first communication protocol over a first network. The device includes a second interface to communicate with second devices according to a second communication protocol over a second network. The second communication protocol is different than the first communication protocol. The device includes a memory including executable instructions, and a processor to execute the instructions to control the exchange of status information for the first devices and the second devices over the first network.

According to at least one example embodiment, the first devices are physical access control readers, and the second devices are one or more mobile communication devices.

According to at least one example embodiment, the memory stores the status information. The status information includes at least one of: one or more first quantities sensed by one or more of the plurality of physical access control readers; and one or more second quantities sensed by one or more of the plurality of mobile communication devices. The one or more first quantities and the one or more second quantities each include at least one of temperature information, air quality information, access information, and pressure information. The status information includes first information regarding a physical location of each mobile communication device relative to locations the physical access controller readers in the reader network; second information to identify active and inactive physical access control readers in the reader network and their current condition; and third information to identify which of the plurality of mobile communication devices are currently connected to the reader network.

In view of the above summary and the following description, it should be appreciated that example embodiments provide systems, devices, and methods that allow for the creation of a mesh network comprised of readers and mobile devices and the exchange of status information between devices in the mesh network. Example embodiments allow the system to track mobile devices, provide guidance information (e.g., in the event of an emergency), create the mesh network in response to an event to save power and network resources, detect faulty or tampered with readers, and provide diagnostic reports on the system.

BRIEF DESCRIPTION OF THE DRAWINGS

The present disclosure is described in conjunction with the appended figures, which are not necessarily drawn to scale:

FIG. 5 illustrates example operations of the system in FIGS. 1-4 according to at least one example embodiment; and FIG. 6 illustrates example operations of the system in FIGS. 1-4 according to at least one example embodiment.

DETAILED DESCRIPTION

Figure 1:
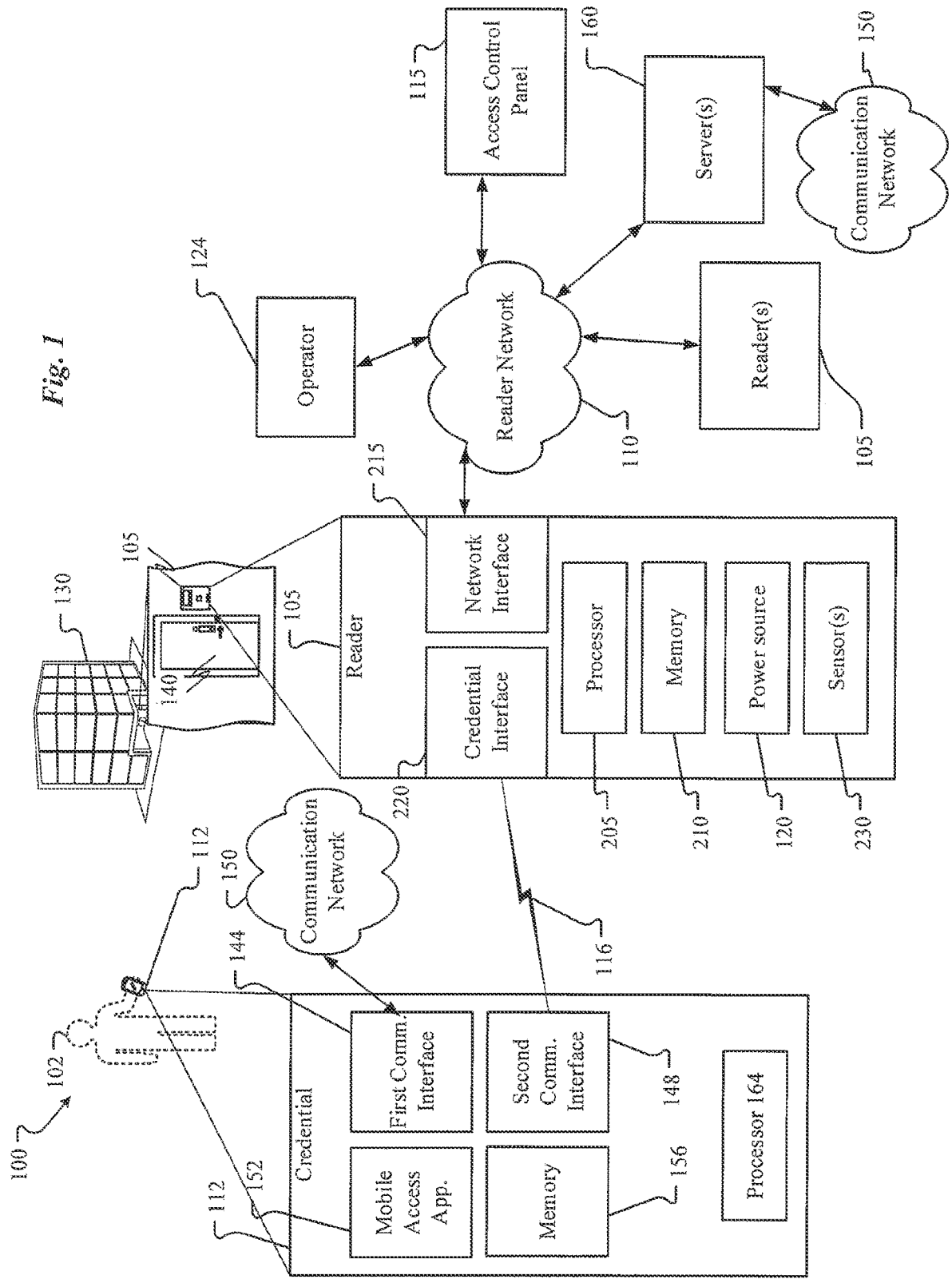
FIG. 1 illustrates an example access control system according to at least one example embodiment.

In particular, a physical access control system is described in which readers interact with portable devices (e.g., credentials, mobile communication devices, etc.) to facilitate protection of physical assets (e.g., to limit access to physical assets). The readers and portable devices, in some embodiments, can be leveraged for purposes beyond basic physical access control functionality. In particular, embodiments of the present disclosure contemplate leveraging readers, portable devices, and other devices to create a mesh network that is able to determine and distribute status information for the portable devices and the readers (and possible other devices) to other the readers and/or other portable devices in the mesh network. The mesh network is effectively overlaid on top of the physical access control system, thereby obviating the need for additional, purpose-built devices, to support the exchange of status information between mobile devices and readers.

It should be appreciated that readers may be configured to communicate with other readers via wireless communication protocols (e.g., via Bluetooth, BLE, ZigBee, etc.) and/or wired communication protocols (e.g., Wiegand, RS485, RS232, TCP/IP, Ethernet, PoE, SMS, etc.). The readers may also be configured to communicate with other locks and/or other devices to create a mesh network—again using wired and/or wireless communication protocols.

With communications between phones and readers becoming less dependent upon very close proximity (e.g., NFC), it is increasing possible to establish meaningful and longer-lasting networks between phones and readers. For instance, with the utilization of Bluetooth Low Energy (BLE) readers, it is possible to establish reader networks as well as phone/reader networks in a physical access control system. This phone and reader network can be used for many purposes including personnel notifications, tracking, reader updates, phone updates, etc.

The proposed solution is to leverage a card communications module (e.g., hardware and/or software) in deployed readers to establish a phone/reader network of devices. This particular network will utilize the card communications module of the reader to facilitate the establishment and maintenance of the reader/phone mesh network. Advantageously, the card communications module used for networking purposes is also the same card communications module used between the reader and phone for access control decisions. Thus, no additional reader costs are required from a hardware perspective to implement this solution. Communication protocols (e.g., BLE, WiFi, NFC, ZigBee, etc.) of any known type may be used to establish communications between the reader network and the mobile communication devices (e.g., the mobile phones).

BLE includes a couple of different operational modes (peer-to-peer and central-peripheral). When exchanging keys for purposes of making access control decisions, the phone and reader may operate in the central-peripheral mode (where the phone is the central device and the reader is the peripheral device), whereas the network may be established and maintained using the peer-to-peer mode. Thus, example embodiments may provide a mechanism to switch the phone from the central mode to the peer mode periodically, either in response to some impetus/input from the user, in response to some impetus/input from a peripheral device (e.g., a reader), etc. According to example embodiments, readers and phones may be configured to exchange status information, messages, and the like with one another.

Assuming that a network of readers and phones is available (e.g., with BLE connectivity between the various devices), it now becomes possible to share information relevant to the physical access control system between the readers and phones. Communication links for the network can be phone-to-reader, reader-to-reader, phone-to-phone, and combinations thereof.

With the establishment of the reader/phone mesh network, it will be possible to track people (e.g., via knowing a location of their phone) and potentially guide them through the physical premises. This may become particularly useful in emergency situations where security personnel need to determine if people have left the premises and whether or not search/rescue resources need to be sent into the premises. Example embodiments are able to search for locations of phones within the reader/phone network. In addition to determining location, the network can also be used to determine if the phone is moving (e.g., establishing communications with different readers). In an emergency situation a couple of different solutions could be deployed. As one example, the person's phone that is identified as moving may have guidance information pushed to his/her phone. The access control application on the phone may receive the guidance information and display the information to the user. For example, the user may be provided with a map of the premises on their phone display along with a proposed exit route. The user's position can be continuously updated on the display, helping them find their way out of the premises via the proposed route. As another example, if specific personnel is a designated fire marshal, then that user's phone may be designated as a fire marshal phone and specific status information can be pushed to that phone through the reader/phone network during an emergency. Exit instructions as well as other information (e.g., updates regarding the emergency and status of the reader/phone network) may be presented to the fire marshal via their phone. Still another example is to utilize sound/light resources of the readers to guide people out of the premises. For example, the route for a person may be presented via beeping or flashing of lights to guide the user down a corridor from one reader to the next. A genuine/unique sound or the like could be used for guidance.

For battery-saving purposes (for phone and reader) it may be desirable to limit the amount of time that a reader/phone network is in place. For example, the phone/reader network may only begin establishing itself in response to a fire alarm sounding. Once the emergency triggers the establishment of the network, then the full features include phone tracking, route navigation, etc., can be provided via the network.

In addition to using the phone/reader network to provide status information to phones for purposes of people tracking and routing, it may also be possible to utilize the phone/reader network to identify the extent of damage in a premises. For example, if a phone/reader network has certain readers (e.g., nodes) that do not connect to the network, then it could be assumed that those readers have been damaged by the event that is causing the emergency. Furthermore, readers can be equipped with sensors (e.g., thermometers, pressure transducers, etc.) and readings from those sensors can be provided back to a central system that is mapping the event. Even reports of doors being opened can be provided from one reader to other nodes in the network (other readers and/or phones) to help understand, up to the minute, what is happening in the access control system.

In addition to reporting and responding to emergency conditions on premises, the proposed invention can also facilitate tamper reporting. The mesh network can be used as a tamper mechanism to see if the reader has been modified by virtue of seeing a node change or go away. In other words, a tamper alarm may be activated if a reader loses connectivity with the reader/phone network. The alarm may be reported to the nearest phone, a nearest reader, or both. The alarm may be silent or audible.

Various aspects of the example embodiments will be described herein with reference to drawings that are schematic illustrations of idealized configurations. It should be appreciated that while particular circuit configurations and circuit elements are described herein, example embodiments are not limited to the illustrative circuit configurations and/or circuit elements depicted and described herein. Specifically, it should be appreciated that circuit elements of a particular type or function may be replaced with one or multiple other circuit elements to achieve a similar function without departing from the scope of example embodiments.

It should also be appreciated that example embodiments described herein may be implemented in any number of form factors. Specifically, the entirety of the blocks or circuits disclosed herein may be implemented in silicon as a fully-integrated solution (e.g., as a single Integrated Circuit (IC) chip or multiple IC chips) or they may be implemented as discrete components connected to a Printed Circuit Board (PCB).

FIG. 1 illustrates an access control system 100 according to at least one example embodiment. The access control system 100 may be for providing access to a building (or premises) 130 through a security door 140 for a user 102 (or installer of the access control system 100). The system 100 includes a reader network 110, an access control reader (or reader) 105, a credential (or mobile device or mobile communication device) 112, an access control panel (or control panel) 115, an operator 124, and a communication network 150. It should be appreciated that the operator 124 and access control panel 115 may be provided as a common component, although such a configuration is not required. In some embodiments, the operator 124 and/or access control panel 115 are owned and/or operated by a hospitality management entity or workplace. In particular, the operator 124 may generate keys for use in a multi-room facility 130 (e.g., hotel, cruise ship, dorm, motel, work office, etc.) and the access control panel 115 may be used to distribute the keys generated by the operator 124 to various mobile devices 112 (e.g., smartphones, tablets, wearable devices, etc.). The control panel 115 may assist the access control reader 105 in making access control decisions with respect to mobile devices 112 presented to the credential interface (or mobile device interface) 220 of the access control reader 105. The access control panel 115 is described in more detail below with reference to FIG. 3. It should be understood that system 100 may include any number of mobile devices 112 and readers 105 having a same or similar structure to those shown in FIG. 1.

The reader network 110 may be a Physical Access Control System (PACS) network to facilitate communication between the network interface 215 and the access control panel 115. For example, the reader network 110 may adhere to RS485 wiring standards to communicate using OSDP and/or adhere to Wiegand wiring standards to communicate using Wiegand protocol. It should be understood that example embodiments are not limited to the reader network 110 operating according to the two wiring standards and protocols (and the reader 105 that auto-configures itself accordingly) described above.

The mobile device 112 may correspond to one or multiple devices that are carried by a user and/or guest of the multi-room facility being managed by the operator 124. The mobile device 112 may correspond to a movable device (e.g., a smartphone, wearable, etc.) capable of being operated by a user or multiple users. When fully functional, the mobile device 112 may be capable of communicating with the access control panel 115 via one or more of the communication network 150 and the reader network 110 using any of the protocols supported by the communication network 150 and/or the reader network 110. In some embodiments, a first communication interface 144 of the mobile device 112 may be used to connect the mobile device 112 directly to the reader network 110, thereby enabling an exchange of keys, status information, etc. between the access control panel 115 and mobile device 112. As shown, the reader 105 may communicate with other readers 105 through the reader network 110. Moreover, it should be understood that the system 100 may include a plurality of mobile devices 112 communicating with one or more readers 105 over the link 116 and/or each other over communication network 150.

However, there may be instances where the first communication interface 144 is disabled or otherwise prohibited from connecting to the communication network 110. For instance, when the mobile device 112 is administered by its user to avoid roaming (e.g., if the mobile device 112 is a mobile phone having cellular service disabled due to international travel), the first communication interface 144 may be limited or completely disabled to avoid roaming and any charges incurred in connection therewith. In such a scenario, the mobile communication device 112 may rely upon a second communication interface 148 to facilitate communications with nearby devices via a proximity-based communication channel 116. Illustrative mobile devices 112 include, without limitation, smartphones, contactless cards, magstripe cards, Wi-Fi-enabled devices, key fobs, Personal Digital Assistants (PDAs), wearable devices (e.g., smart watches, smart clothes), etc.

In some embodiments, the communication channel 116 may correspond to a Bluetooth low energy (BLE) communication channel. In some embodiments, the communication channel 116 may correspond to a near field communication (NFC) channel. In some embodiments, the communication channel 116 may correspond to an Infrared communication channel. In some embodiments, the communication channel 116 may correspond to an Ultrasonic communication channel. Any other type of communication protocol that is dependent upon proximity and/or line-of-sight may be utilized between the mobile device 112 and reader 105. Other protocols may also be used to exchange information between the mobile device 112 and the reader 105. For instance, the reader 105 may include a barcode or Quick Response (QR) code dynamically displayed on a screen thereof, or affixed by a sticker or the like to a surface of the reader 105. The mobile device 112 may obtain information from the reader 105 by taking one or more images of the reader's 105 screen or sticker and decoding the barcode and/or QR code. Another type of communication channel 116 that may be used without departing from the scope of the present disclosure is a peer-to-peer Wi-Fi connection. When possible (e.g., when BLE or NFC is used as the channel 116), no manual pairing process is needed, thereby making it possible to simply tap the reader 105 with the mobile device 112 to establish the communication channel 116 it should be appreciated, however, that access to the communication channel 116 (and more specifically the device interface 220 of the reader 105) may be restricted to mobile devices 112 having a valid mobile access application 152 stored thereon. A mobile device 112 without the mobile access application 152 may not be allowed to establish a communication channel 116 with the device interface 220. Thus, the mobile access application 152 may be used to perform an automated mutual authentication with the reader 105 before establishing the communication channel 116 or as part of establishing the communication channel 116.

The mobile device 112 may include computer memory 156 (e.g., volatile and/or non-volatile) that stores one or more Operating Systems (O/S) and the mobile access application 152, among other items. The mobile device 112 may also include a processor 164 (e.g., a microprocessor or collection of microprocessors), one or more drivers, a user interface, and a power module. The mobile device 112 may further include a first communication interface 144 (e.g., a communication network interface) and a second communication interface 148 (e.g., a credential interface). The memory 156 stores status information for the mobile devices 112 and the readers 105 in a mesh network and may include a secure element for storing the one or more access control keys.

The memory 156 of the mobile device 112 may correspond to any type of non-transitory computer-readable medium. In some embodiments, the memory 156 may include volatile or non-volatile memory and a controller for the same. Non limiting examples of memory that may be utilized in the mobile device 112 include RAM, ROM, buffer memory, flash memory, solid-state memory, or variants thereof.

The processor 164 of the mobile device 112 may correspond to one or many microprocessors that are contained within the housing of the mobile device 112 with the memory. In some embodiments, the processor 164 incorporates the functions of the mobile device's 112 Central Processing Unit (CPU) on a single Integrated Circuit (IC) or a few IC chips. As with other processors disclosed herein, the processor 164 may be a multipurpose, programmable device that accepts digital data as input, processes the digital data according to instructions stored in its internal memory, and provides results as output. The processor 164 may implement sequential digital logic as it has internal memory. As with most known microprocessors, the processor 164 may operate on numbers and symbols represented in the binary numeral system.

The communication network 150 may facilitate communication between the first communication interface 144 and the reader network 110. The communication network 150 may enable communication between the communication interface 144 of the mobile device 112 and one or more other communication interfaces 144 of other mobile devices 112. The communication network 150 may include any type of communication medium or collection of communication equipment that enables remote communication devices to exchange information and/or media with one another using any type of known or yet-to-be developed transport protocol. The communication network 150 may facilitate wired and/or wireless communication technologies. The Internet is an example of a communication network 150 that constitutes an Internet Protocol (IP) network consisting of many computers, computing networks, and other communication devices located all over the world, which are connected through many telephone systems and other means. Other examples of the communication network 150 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network (e.g., 3G, 4G, LTE, etc.), and any other type of packet-switched or circuit-switched network known in the art. In addition, it can be appreciated that the communication network 150 need not be limited to any one network type, and instead may include a number of different networks and/or network types. Moreover, the communication network 150 may include a number of different communication media such as coaxial cable, copper cable/wire, fiber-optic cable, antennas for transmitting/receiving wireless messages, and combinations thereof.

The driver(s) of the mobile device 112 may correspond to hardware, software, and/or controllers that provide, specific instructions to hardware components of the mobile device 112, thereby facilitating their operation. For instance, interfaces 144, 148, may each have a dedicated driver that provides appropriate control signals to facilitate their operation. The driver(s) may also include the software or logic circuits that ensure the various hardware components are controlled appropriately and in accordance with desired protocols. For instance, the driver of the second communication interface 148 may be adapted to ensure that the second communication interface 148 follows the appropriate proximity-based protocols (e.g., BLE, NFC, infrared, Ultrasonic, peer-to-peer Wi-Fi, etc.) such that the second communication interface 148 can exchange communications with the reader 105. Likewise, the driver of the first communication interface 144 may be adapted to ensure that the first communication interface 144 follows the appropriate network communication protocols (e.g., TCP/IP (at one or more layers in the OSI model), UDP, RTP, GSM, LTE, Wi-Fi, etc.) such that the interface 144 can exchange communications via the communication network 150. As can be appreciated, the driver(s) may also be configured to control wired hardware components (e.g., a USB driver, an Ethernet driver, etc.).

The second communication interface 148 may correspond to the hardware that facilitates communications via the communication channel 116. The second communication interface 148 may include a Bluetooth interface (e.g., antenna and associated circuitry for Bluetooth Low Energy), a Wi-Fi/802.11N interface (e.g., an antenna and associated circuitry), an NFC interface (e.g., an antenna and associated circuitry), an Infrared interface (e.g., LED, photodiode, and associated circuitry), and/or an Ultrasonic interface (e.g., speaker, microphone, and associated circuitry). In some embodiments, second communication interface 148 is specifically provided to facilitate proximity-based communications with a reader 105 via communication channel 116 or multiple communication channels 116.

The first communication interface 144 may include hardware that facilitates communications with other communication devices over the communication network 150. As mentioned above, the first communication interface 144 may include an Ethernet port, a Wi-Fi card, a Network Interface Card (NIC), a cellular interface (e.g., antenna, filters, and associated circuitry), or the like. The first communication interface 144 may be configured to facilitate a connection between the mobile device 112 and the communication network 150 and may further be configured to encode and decode communications (e.g., packets) according, to a protocol utilized by the communication network 150.

The optional secure element/data storage of the memory 156 may correspond to one or multiple secure memory devices that are capable of storing data in an encrypted and secure manner. Communications between the secure element of the memory 156 and the interfaces 144, 148 may also be secured, thereby ensuring that data received at the mobile device 112 is securely stored in the secure element of the memory 156 without exposure. The secure element of the memory 156 may be integrated into the mobile device 112 or it may be removable in nature. Suitable examples of secure elements include, without limitation, a Universal Integrated Circuit Card (UICC), an embedded SE, and microSD.

The power module of the mobile device 112 may include a built-in power supply (e.g., battery) and/or a power converter that facilitates the conversion of externally-supplied AC power into DC power that is used to power the various components of the mobile device 112. In some embodiments, the power module may also include some implementation of surge protection circuitry to protect the components of the mobile device 112 from power surges.

The reader 105 may correspond to a purpose-built reader/writer or similar type of device. In some embodiments, the reader 105 includes a device interface or credential interface 220 and a network interface 215. As shown in FIG. 1, the reader 105 may communicate with the access control panel 115, other readers 105, and even mobile devices 112 through reader network 110 using a type of protocol employed by the reader network 110. For example, the network interface 215 conducts communication using RS485 wiring standards and/or using Wiegand wiring standards.

The reader 105 may further include a processor 205, memory 210, one or more sensors 230 and a power source 120. The processor 205 may be similar or identical to the processor 164 described in connection with the mobile device 112. For instance, the processor 205 may correspond to a microprocessor or the like. Similarly, the memory 210 may correspond to any type of computer memory such as the memory 156 described with respect to the mobile device 112. The memory 210 may include computer-executable instructions that, when executed by the processor 205, enable certain functions of the reader 105 to be performed.

The reader may include one or more sensors 230. The one or more sensors 230 may include any necessary hardware and/or software for functions associated with sensing temperature (e.g., internal and external), pressure, humidity, air quality, access (e.g., a number of times the reader 105 has been accessed by a mobile device 112, whether authentication of a mobile device 112 is successful, a current state (open or closed) of a door associated with the reader 105, a number/frequency of mobile device read attempts at a particular reader 105, whether denial of access has occurred, tamper conditions, etc.), and the like. The memory 210 may store sensed quantities from the sensors 230. The type and amount of sensors and sensed quantities may be a design parameter set based on empirical evidence and/or user defined.

The system 100 may include one or more servers 160 in communication with the reader network 110. The servers 160 may store and/or provide authentication information to readers 105 and mobile devices 112 through communication network 150 and/or reader network 110. The servers 160 may store and/or provide status information for the mobile devices 112 and the readers 105 exchanged over the reader network 110 and/or the communication network 150. Examples of status information are provided below.

Example operations of the reader 105 are described in more detail below with reference to FIGS. 2-6.

Figure 2:
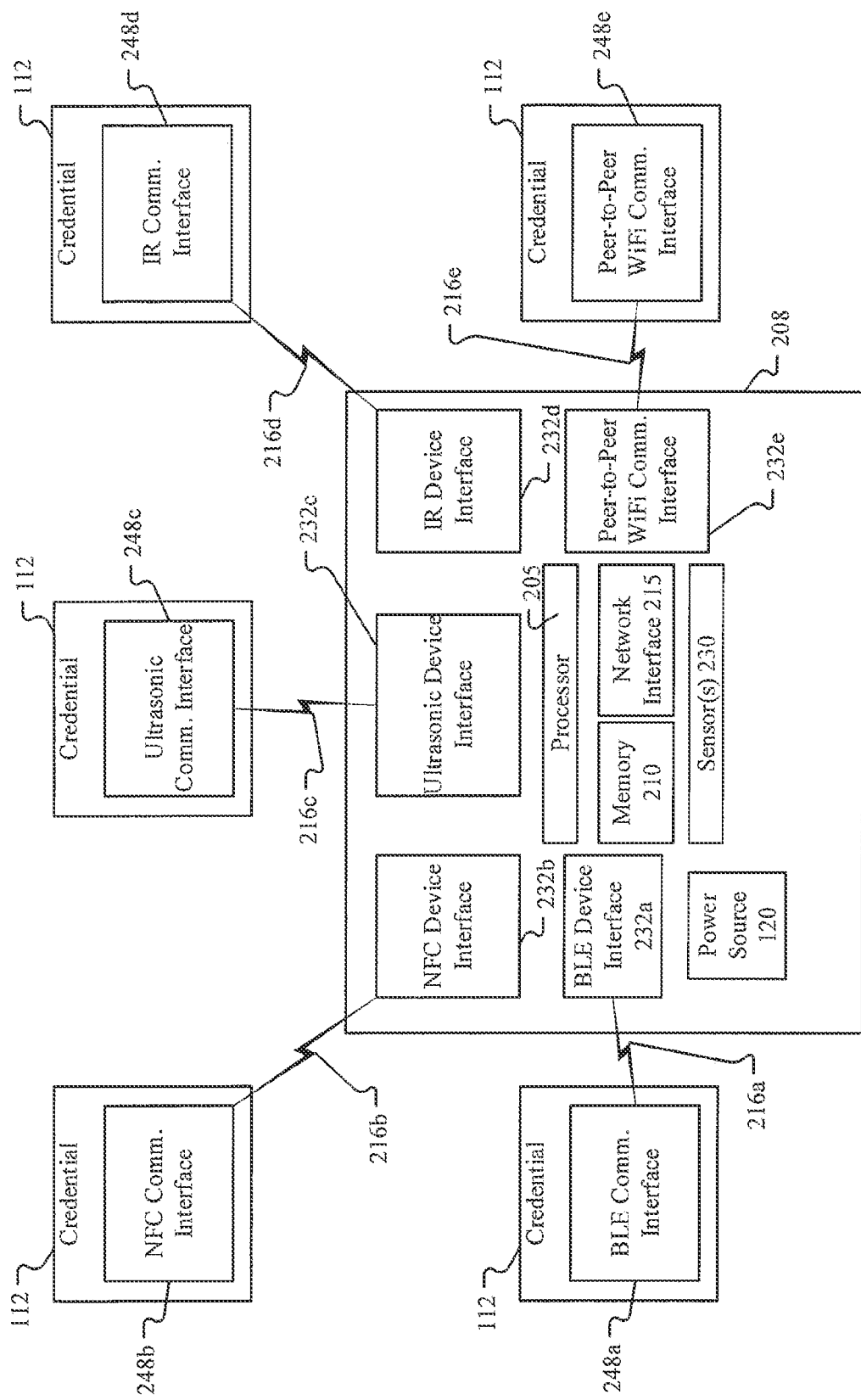
FIG. 2 illustrates an example structure of the access control reader of FIG. 1 according to at least one example embodiment.

A reader 105 according to at least one example embodiment is depicted in FIG. 2. It should be understood that the reader 105 of FIG. 2 illustrates additional details of the reader(s) 105 in FIG. 1. Thus, like the reader(s) 105 in FIG. 1, the reader shown in FIG. 2 includes a power source 120, one or more sensors 230, and a memory 210 storing instructions for execution by the processor 205. Such instructions, when executed by the processor 205, enable the processor 205 to carry out needed functions, including, for example, collection, storage, and exchange of status information for the readers 105 and the mobile devices 112.

The access control reader 105 may communicate (e.g., wirelessly communicate) with mobile device 112 according to a communications protocol to allow or to deny access to a secured area such as a building, a room, etc. The wireless (or contactless) communication may be achieved by antennas built into the reader 105 and the mobile device 112. The reader 105 and the mobile device 112 may exchange data signals and/or power signals through respective antennas. The reader 105 may communicate with the access control panel 115 through reader network 110 using one or more communication protocols.

The protocol used by the reader network 110 may be of a particular type. For example, the protocol may be a first type, which allows for the reader 105 to conduct bidirectional (or two way) communications with the control panel 115 and other readers 105 over the reader network 110.

The access control panel 115 assists the reader 105 in making access control decisions with respect to a mobile device 112. In order for the control panel 115 to do so, the control panel 115 should be informed of which communications protocol is being employed by the reader 105. Accordingly, it is desired for the reader 105 to easily inform the control panel 115 of the communications protocol being employed by the reader 105.

The reader 105 of FIG. 2 also includes one or more device interfaces 232*a*-*e* (collectively the credential interface 220 in FIG. 1) for communicating with mobile devices 112 of different types, for example. To increase the number of mobile devices 112 with which the reader 105 can communicate, the reader 105 may include, for example, a BLE device interface 232*a*, an NFC device interface 232*b*, an ultrasonic device interface 232*c*, an infrared device interface 232*d*, and a peer-to-peer Wi-Fi device interface 232*e*. Thus, as long as a mobile device 112 has a communication interface 248*a*-*e* compatible with at least one of the communication interfaces 232*a*-*e* of the reader 105, the mobile device 112 will be able to communicate with the reader 105. The reader 105 also includes a network interface 215 for communicating with access control panel 115 and other readers 105 via the reader network 110.

As depicted in FIG. 2, a mobile device 112 including a BLE communication interface 248*a* may establish a BLE communication channel 216*a* with the BLE device interface 232*a* of the reader 105. The mobile device 112 can then transmit a key update request to the reader 105 via the communication channel 216*a* and receive a key update from the reader 105 via the same communication channel 216*a*. Likewise, a mobile device 112 including an NFC communication interface 248*b* may establish an NFC communication channel 216*b* with the NFC device interface 232*b* of the reader 105. A mobile device 112 including an ultrasonic communication interface 248*c* may establish an ultrasonic communication channel 216*c* with the ultrasonic device interface 232*c* of the reader 105. A mobile device 112 including an infrared communication interface 248*d* may establish an infrared communication channel 216*d* with the infrared device interface 232*d* of the reader 105. A mobile device 112 including a peer-to-peer WiFi communication interface 248*e* may establish a peer-to-peer WiFi communication channel 216*e* with the peer-to-peer WiFi device interface 232*e* of the reader 105. In embodiments, the reader 105 is capable of communicating with a plurality of mobile devices 112 simultaneously (e.g. over multiple device interfaces 232), while in other embodiments the reader 105 is capable of communicating over only one device interface 232 at a given time. In embodiments, the reader 105 is configured to initiate communications with a mobile device 112 after it is tapped by the mobile device 112, while in other embodiments the reader 105 is configured to initiate communications with any mobile device 112 in response to a signal from the mobile device 112. In still other embodiments, the reader 105 is configured to scan for mobile devices 112 and to initiate communications (or at least attempt to initiate communications) with any mobile device 112 within communication range.

Figure 3:
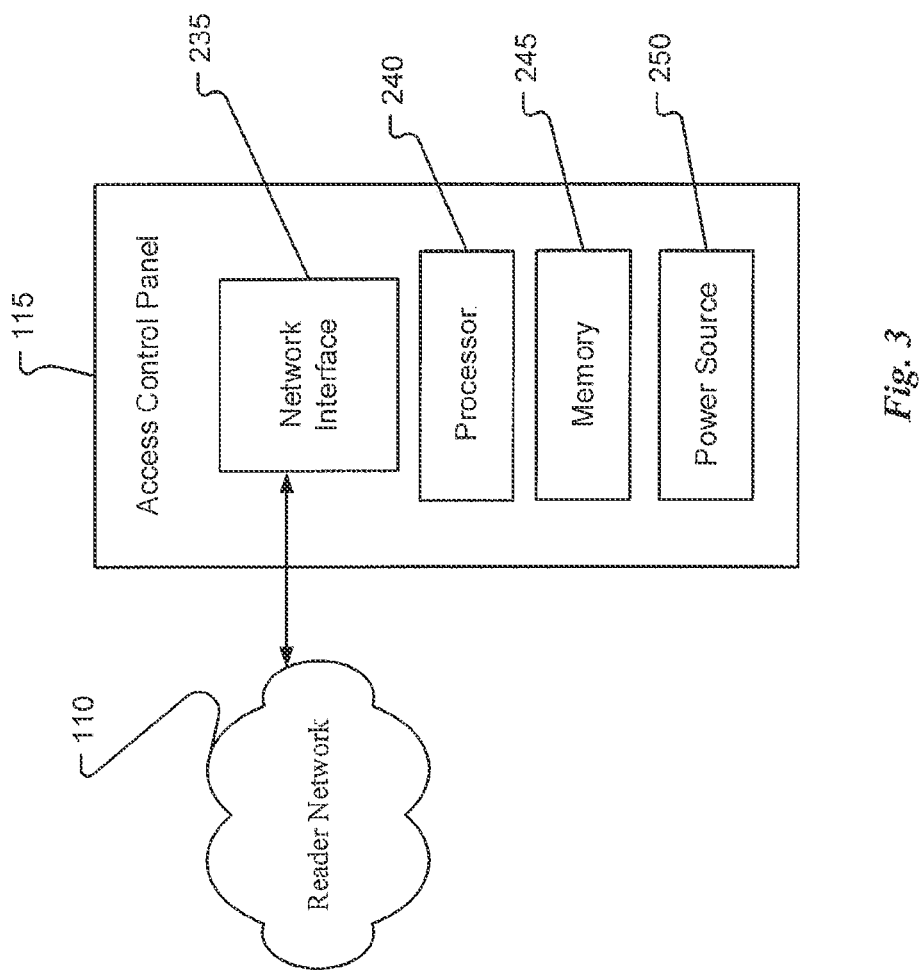
FIG. 3 illustrates an example structure of the access control panel of FIG. 1 according to at least one example embodiment.

FIG. 3 illustrates an example structure of the access control panel 115 of FIG. 1.

According to at least one embodiment, the access control panel 115 includes a network interface 235. The network interface 235 may provide a go-between for the access control panel 115 and the reader network 110.

The access control panel 115 may further include a processor 240, memory 245, and a power source 250. The power source 250 may provide power for the access control panel 115. The processor 240 may be similar of identical to the processor described in connection with the mobile device 112 and/or the reader 105. For instance, the processor 240 may correspond to a microprocessor or the like. Similarly, the memory 245 may correspond to any type of computer memory. The memory 245 may include computer-executable instructions that, when executed by the processor 240, enable certain functions of the reader access control panel 115 to be performed. The memory 245 may include a listing of access control rules (e.g., which mobile devices 112 are allowed access to which readers 105 and when). The memory 245 may also be a repository for a network registry. For instance, the memory 245 may include a listing of mobile devices 112 that are trusted and should be allowed to exchange communications with the reader network 110 (e.g., to receive status updates, etc.). The memory 245 may also include a list of when those trusted mobile devices 112 last communicated with a reader 105 and what actions/data exchanges were taken. Either the readers 105 or the control panels 115 will have this information to enable the stitching of the reader network 110 with the mobile device network 150 thereby creating the hybrid or mesh network. The above mentioned lists and information stored on memory 245 may additionally or alternatively be stored in memories 156 and/or 210.

Figure 4:
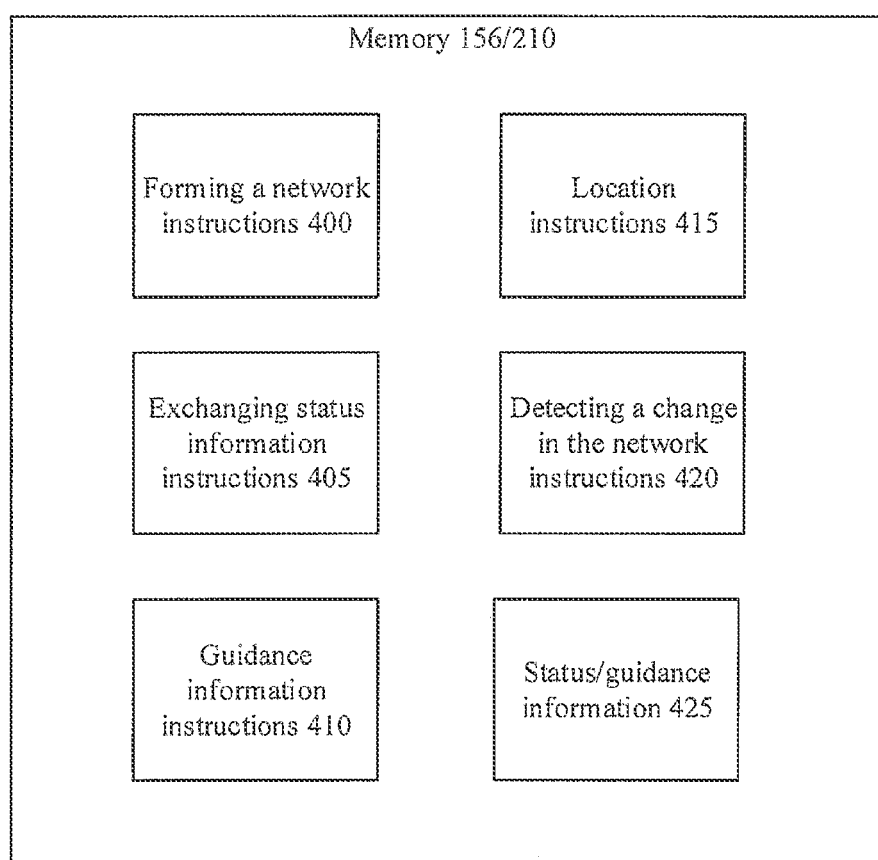
FIG. 4 illustrates example instructions stored on the memories of the access control reader and the credential of FIG. 1 according to at least one example embodiment.

FIG. 4 illustrates example instructions stored in the memories 156 and/or 210 of FIGS. 1-3. The memories 156/210 may include instructions for forming a network 400 that cause the processors 164/205 to form a network. For example, the forming network instructions 400 of the memory 156 include instructions to cause the processor 164 of one mobile device 112 to form a first network with another mobile device 112 (e.g., using the first communication interface 144 and over the communication network 150) and/or to form a second network with one or more readers 105 (e.g., directly through the reader network 110 using the first communication interface 144 and/or by using the second communication interface 148 and the link 116). As another example, the instructions 400 on the memory 210 include instructions to cause the processor 205 of one reader 105 to form a first network with one or more other readers 105 (e.g., using the network interface 215 and the reader network 110) and/or to form a second network with one or more of the mobile devices 112 (e.g., using the credential interface 220 and the link 116).

The memories 156/210 may include exchanging status information instructions 405 and exchanging guidance information instructions 410 for causing the processors 164/205 to collect and exchange status information and/or guidance information between the readers 105 and/or the mobile devices 112. For example, the memory 156 includes instructions 405 to cause the processor 164 to generate and send status information of the mobile device 112 over the mesh network to one or more readers 105 and/or one or more other mobile devices 112. The memory 156 may include guidance information instructions 410 that cause the processor 164 to request guidance information from the mesh network (e.g., readers of the mesh network). As another example, the memory 210 includes instructions 405 to cause the processor 205 to request status information of one or more mobile devices 112 and/or one or more other readers 105, store the status information, and exchange status information with other readers 105 or with mobile devices 112. The memory 210 may include instructions 410 to cause the processor 205 to send the guidance information, for example, in response to a trigger. Examples of status information and guidance information are provided below.

The memories 156/210 may include location instructions 415 to provide/determine locations of the mobile devices 112. For example, the location instructions 415 of the memory 156 may include instructions for sending location information of a mobile device 112 to one or more of the readers 105 over the link 116 and/or to one or more other mobile devices 112 over the communication network 150. As another example, the location instructions 415 of the memory 210 may include instructions for collecting the location information from the mobile device(s) 112 (or for determining locations of the mobile devices 112 from the status information) and then providing an indication of the location of the mobile device(s) 112 (e.g., relative to readers 105 in the reader network 110) to another reader 105 or one of the mobile devices 112.

The memories 156/210 may include instructions to detect a change in the network 420. For example, the memory 210 may include detecting a change in the network instructions 420 that cause the processor 205 to poll the reader network 110 (e.g., automatically at desired intervals or in response to an event such as user input) to determine a status/condition of one or more of the readers 105 in the reader network 110. For example, the instructions 420 on the memory 210 may cause the processor 205 to retrieve identification information and condition information of each reader 105 in the reader network 110 in order to determine whether one of the readers 105 is damaged or offline. Here, the memory 210 of each reader 105 may include a log of reader IDs and/or condition information that is continually updated as readers 105 are added to the reader network 110. When the IDs are retrieved by a particular reader 105, that particular reader 105 can compare the log of IDs to the IDs in the memory 210 to determine if all IDs have been received. If the particular reader's 105 log indicates that an ID has not been retrieved, then it may be determined that the reader whose ID is missing may be damaged or offline. As another example, the memory 156 may include detecting a change in network instructions 420 that cause the processor 164 to add a particular mobile device 112 to the mesh network of readers 105 and mobile devices 112, and/or to request and receive a notification regarding a potentially damaged or offline reader 105.

The memories 156/210 may store the status and/or guidance information 425, which may include any of the below examples given for status and guidance information as well as any other information that is relevant to maintaining and operating the mesh network of readers 105 and mobile devices 112. The effects of instructions 400, 405. 410, 415, and 420 when carried out by the processors 164/205 are discussed in additional detail below with reference to FIGS. 5 and 6.

In general, status information far the readers 105 and the mobile devices 112 is collected and exchanged using known message protocols (SMS, NFC, BLE protocols, etc). For example, status information of the readers 105 and/or the mobile devices 112 may be collected by the readers 105 and/or the mobile devices 112 in response to a request from the mesh network. The request may be a broadcast request, a multicast request, and/or a unicast request from a requesting reader 105 and/or mobile device 112. That is, all devices that receive the request return the requested status information to the requesting device. The requesting device may then share the status information with other devices. For example, if the requesting device is a reader 105, the reader 105 may collect the status information and share the status information with other readers 105 over the reader network 110. Additionally or alternatively, each reader 105 and mobile device 112 may send their respective status information at desired intervals (e.g., intervals of milliseconds, seconds, minutes, etc.).

According to at least one example embodiment, the status information includes first information regarding a physical location of each mobile communication device 112. For example, the physical location may be relative to locations of the physical access control readers 105 in the reader network 110. The first information may be collected by the readers 105 as the mobile communication devices 112 send occasional reports to the readers 105 over the link 116. The reports may be sent by the mobile communication devices 112 to the readers 105 in response to a broadcast request signal from the readers 105 or automatically by the mobile communication devices 111 (e.g., at desired intervals).

In at least one example embodiment, the status information includes second information to identify active and inactive physical access control readers 105 in the reader network 110 and their current condition (e.g., operating status, usage information, conditions of the reader's environment). The second information may be used to detect damaged or inoperable readers 105 within the network. The second information may be collected in response to a request (e.g., broadcast request) from one or more of the mobile communication devices 112 and/or one or more of the readers 105 (e.g., a master reader or a designated fire marshal mobile device). In order to identify the readers 105 within the network 110, the second information may include unique ID of each reader 105. The unique ID may be a serial number of the reader 105 or some other unique identification information of the reader 105.

The status information may include third information to identify which of the plurality of mobile communication devices are currently connected to the reader network. The third information may be collected in a manner similar to or the same as the first information. The third information may include a unique ID of each mobile communication device 112 (e.g., a phone number, serial number, etc.).

In at least one example embodiment, the memory 210 stores the first, second, and third information in respective logs (e.g., tables), which provides convenient organization of the information for review by an operator and/or for exchange between readers 105 and/or mobile devices 112. The tables may be continually updated as the status information is collected and stored (e.g., upon request or at regularly scheduled intervals).

The status information may include one or more first quantities sensed by one or more of the plurality of physical access control readers 105 through sensors 230. The status information may include one or more second quantities sensed by one or more of the plurality of mobile communication devices 112 through sensors on each mobile device 112. According to at least one example embodiment, the one or more first quantities and the one or more second quantities each include at least one of temperature information (e.g., ambient temperature, reader or mobile device temperature, etc.), air quality information near the respective device (e.g., humidity, particulate counts, etc.), access information (e.g., a number of times a reader has been accessed, a state of an associated door (open or closed), a number of times a mobile device has accessed a particular reader(s)), pressure information (e.g., air pressure), a listing of other mobile devices 112 in communication range of the reader 112.

According to at least one example embodiment, the memory 210 stores guidance information. According to at least one example embodiment, the readers 105, via the reader network 110, send the guidance information to one or more of the plurality of mobile communication devices 112. For example, the readers 105 may send the guidance information in response to an emergency event such as a fire, a tornado a suspected active shooter, or the like. Users of the mobile devices 112 can then use the guidance information to assist with exiting the premises 130 or finding a safe zone within the premises 130. According to at least one example embodiment, the guidance information includes at least one of audio and video relating to the premises 130 in which the plurality of physical access control readers 105 are located. The video may include a map of the premises 130 that updates in real time to show a location of the one or more of the plurality of mobile communication devices 112 within the premises 130. The audio may include one or more sounds that accompany the video or that stand alone to provide audible directions to the user. Alternatively or additionally to storing the guidance information in the memory 210, the guidance information may be stored on and retrieved from the servers 160. Such audio and video information may be sent to the mobile devices 112 according to known protocols and methods for sending media.

It should be understood that the above described status information and guidance information may additionally or alternatively be sent to/stored on the servers 160. Here, collection and exchange of the status information is performed in a manner similar to or the same as that described above. That is, collection and exchange can occur in response to a request from the servers 160 or occur at regularly scheduled intervals. Regardless of where the guidance and status information are stored, it should be understood that collection and exchange of status information and guidance information may occur through one or more of the link 116, the communication network 150 and the reader network 110.

In view of at least FIGS. 1-4 it may be said that an access control system 100 includes a plurality of physical access control readers 105 that form a reader network 110 which utilizes a first communication protocol (e.g., RS485, Wiegand, Zigbee, SMS, etc.). The access control system 100 includes a plurality of mobile communication devices 112 each having a first communication interface 144 and a second communication interface 148. The first communication 144 interface enables the mobile communication devices 112 to access a mobile communication network 150 which utilizes a second communication protocol (e.g., WiFi or a known cellular protocol such as LTE). The second communication interface 148 enables the mobile communication devices 112 to communicate with the access control readers 105. The plurality of physical access control readers 105 exchange status information for the plurality of physical access control readers 105 and for the plurality of mobile communication devices 112 (e.g., over the reader network 110). The second communication interface 148 utilizes a third communication protocol. For example, third protocol should match a type the second communication interface, which can be one of a Bluetooth Low Energy (BLE) interface 232a, a WiFi interface 232e, a near field communication (NFC) interface 232b, an ultrasonic device interface 232c, and a Zigbee interface.

FIG. 5 is a flow diagram illustrating example operations of the system(s) in FIGS. 1-4. While a general order for the steps of the method 500 is shown in FIG. 5, the method 500 can include more or fewer steps or can arrange the order of the steps differently than those shown in FIG. 5. Generally, the method 500 starts at operation 505 and ends at operation 540. The method 500 can be executed as a set of computer-executable instructions executed by the processor(s) 164 and/or 205 and encoded or stored on computer readable mediums 156/210. Alternatively or additionally, the operations discussed with respect to FIG. 5 may be implemented by other various elements of the system(s) FIGS. 1-4. Hereinafter, the method 500 shall be explained with reference to the systems, components, assemblies, devices, user interfaces, environments, software, etc. described in conjunction with FIGS. 1-4.

In operation 505, the method 500 includes forming a first network that enables communication between a plurality of physical access control readers 105. For example, readers 105 form the first network, which may correspond to the reader network 110 that uses a first communication protocol (e.g., RS485, Wiegand, Zigbee, SMS, etc.). Here, the readers 105 in the reader network 110 may exchange status information and/or guidance information with one another as desired. Because readers 105 typically have a constant and reliable power source, there minimal burden to allow the exchange of information at this stage.

In operation 510, the method 500 determines whether the system 100 is in a power saving mode. If so, the method 500 determines whether a trigger even has occurred in operation 515. The trigger event may be an emergency event such as a fire, tornado, an active shooter, etc. The trigger event may also be some input from the operator 124 to cease the power saving mode, or a preprogrammed command that occurs at desired intervals. As can be appreciated, the power saving mode saves power by avoiding creation of the second network until the trigger even occurs.

If, in operation 510, the method 500 determines that the power saving mode is not enabled, then the method 500 proceeds to operation 520 to form a second network. The second network enables communication between the plurality of physical access control readers 105 and a plurality of mobile communication devices 112. For example, the second network may be referred to as a mesh network of mobile devices 112 and readers 105. Forming the second network may utilize various elements of the mobile devices 112 and the readers 105, such as the interfaces 144, 148, 116, and/or 215, and/or the networks 110, 150, and/or link 116. The second network may utilize one or more second communication protocols (e.g., WiFi or a known cellular protocol such as LTE).

In operation 530, the method 500 collects, exchanges, and/or stores the status information and/or the guidance information. Operation 530 may be carried out according to any of the procedures described above for collection, exchange, and storage of the status information and the guidance information (e.g., by responding to requests or triggers, sending information at desired intervals, etc.). According to at least one example embodiment, operation 530 includes exchanging, over the first network 110, the status information for the plurality of physical access control readers 105 and for the plurality of mobile communication devices 112. As a result operation 530, the readers 105 in the reader network 110 have knowledge of the status information for each mobile device 112 in the mesh network as well as the status information of other readers 105 in the mesh network. This knowledge may prove useful for evaluating the mesh network and for providing other information (see FIG. 6).

In operation 535, the method 500 determines whether another trigger event has occurred. If not, the method 500 returns to operation 530 and continues to monitor the mesh network for changes and perform operation 530 as often as desired or programmed. If the trigger event has occurred in operation 535, the method 500 proceeds to operation 540 to perform at least one additional operation, described in more detail below with reference to FIG. 6. For example, the trigger event may be an instruction from the operator 124, one of the mobile devices 112, and/or one of the readers 105 to perform the at least one additional operation. In another example, the trigger event may be an emergency event the same as that described with respect to operation 510. In still another example, the trigger event may be a preprogrammed command to perform the at least one additional operation at a desired time or interval.

FIG. 6 is a flow diagram illustrating example operations of the system(s) in FIGS. 1-4. In more detail, FIG. 6 illustrates examples of the at least one additional operation from operation 540 in FIG. 5. While a general order for the steps of the method 600 is shown in FIG. 6, the method 600 can include more or fewer steps or can arrange the order of the steps differently than those shown in FIG. 6. Generally, the method 500 starts at operation 505 and ends at operation 540. The method 600 can be executed as a set of computer-executable instructions executed by the processor(s) 164/205 and encoded or stored on a computer readable medium 156/210 Alternatively or additionally, the operations discussed with respect to FIG. 6 may be implemented by other various elements of the system(s) FIGS. 1-4. Hereinafter, the method 600 shall be explained with reference to the systems, components, assemblies, devices, user interfaces, environments, software, etc. described in conjunction with FIGS. 1-5.

In operation 605, the method 600 determines what type of instruction has been prompted by the trigger event in operation 540. Thus, operation 605 may occur after operation 540. In one example, the type of instruction may include an instruction to evaluate the mesh network of readers 105. In another example, the type of instruction may include an instruction to utilize the mesh network of mobile devices 112 and readers 105 to provide other information (e.g. information not related to evaluating the mesh network). If the type of instruction is to utilize the mesh network to provide other information, then the method 600 may proceed to operation 610.

In operation 610, the method 600 includes determining, by one or more of the plurality of physical access control readers 105, locations of the mobile communication devices 112 based on the exchanged status information from operation 530. According to at least one example embodiment, the locations of the mobile devices 112 may be determined relative the one or more of the plurality of physical access control readers 105. In operation 615, the method 600 includes providing, over the second network (e.g., formed by operation 520), guidance information to one or more of the plurality of mobile communication devices 112 based on the determined locations. As discussed above, the guidance information may include audio and/or video for guiding users of the mobile devices 112 through or out of the premises 130. Although not explicitly shown, it should be understood that other operations may occur upon determining that the type of instruction is to utilize the mesh network to provide other information. For example, the method 600 may additionally or alternatively include tracking the mobile devices 112 based on the determined locations and analyzing this data to improve traffic flow within the premises 130 and/or improve efficiency of a workplace (e.g., by locating personnel in cubicles/offices based on the tracking data). In yet another example operation, the method 600 may including providing specific information to a specific mobile device 112. For example, if the specific mobile device 112 is a designated fire marshal device, then the specific information may include emergency instructions, updates regarding the locations of other mobile devices 112, etc.

If the type of instruction determined in operation 605 is an instruction to evaluate the mesh network of readers 105, then the method proceeds to operation 620.

In operation 620, the method 600 includes detecting a change in the first network (e.g., the reader network 110). For example, the method 600 detects a change in a number of the plurality of physical access control readers 105 that are in the first network 110. The change may be detected in the same manner as that described above with respect to FIGS. 1-4. For example, the change may be detected by comparing a retrieved list of unique reader IDs 105 to a list of already collected reader IDs (e.g., on the memory 210) to determine whether the lists match. If not, then there has been a change in the number of readers 105 connected to the network 110.

In operation 625, the method 600 includes providing a notification of the change to one or more of the plurality of mobile communication devices 112. Here, the notification may include information to identify where the detected change occurred within the first network 110. This information can be used by the operator 124 or other user of a mobile device 112 to identify a potentially damaged or inoperable reader. That is, if the retrieved number of reader IDs is fewer than the stored number of reader IDs, then the notification may include the reader ID and location of the reader 105 that is missing from the retrieved list of IDs. The notification may be received in the form a text message (e.g., SMS message), a sound, and the like. Another example of operations to evaluate the mesh network includes producing a diagnostic report that provides the status or condition of readers 105 and mobile devices 112 in the mesh network.

In view of the above description, it should be appreciated that example embodiments relate to a device including a first interface to communicate with first devices according to a first communication protocol over a first network. The device may include a second interface to communicate with second devices according to a second communication protocol over a second network. The second communication protocol is different than the first communication protocol. The device may include a memory including executable instructions, and a processor to execute the instructions to control the exchange of status information for the first devices and the second devices over die first network. In at least one example embodiment, the first devices are physical access control readers 105, and the second devices are one or more mobile communication devices 112. The memory of the device memory stores the status information, which includes at least one of: one or more first quantities sensed by one or more of the plurality of physical access control readers; one or more second quantities sensed by one or more of the plurality of mobile communication devices, wherein the one or more first quantities and the one or more second quantities each include at least one of temperature information, air quality information, access information, and pressure information; first information regarding a physical location of each mobile communication device relative to locations the physical access controller readers in the reader network; second information to identify active and inactive physical access control readers in the reader network and their current condition; and third information to identify which of the plurality of mobile communication devices are currently connected to the reader network.

In view of the foregoing, it should be appreciated that example embodiments provide systems, devices, and methods that allow for the creation of a mesh network comprised of readers and mobile devices and the exchange of status information between devices in the mesh network. Example embodiments allow the system to track mobile devices, provide guidance information (e.g., in the event of an emergency), create the mesh network in response to an event, detect faulty or tampered with readers, and provide diagnostic reports on the system. While illustrative example embodiments of the disclosure have been described in detail herein, it is to be understood that the inventive concepts may be otherwise variously embodied and employed, and that the appended claims are intended to be construed to include such variations.

What is claimed is:

1. A method for an access control system, the method comprising:
    forming a wired network that enables communication between a plurality of physical access control readers and at least one access control panel utilizing a first communication protocol, the at least one access control panel assisting the plurality of physical access control readers in making access control decisions;
    forming, in response to determining a triggering event has occurred, connections to a second network that enables communication between the plurality of physical access control readers using a WiFi communication protocol;
    enabling communication between the plurality of physical access control readers and a plurality of mobile communication devices using a proximity-based communication protocol;
    enabling communication between the plurality of mobile communication devices and one or more servers, separate from the at least one access control panel, using a second communication protocol;
    exchanging, wirelessly using at least one of the WiFi communication protocol or the proximity-based communication protocol, at least one of a notification, device tracking information, device status information, or a reader update between two or more of the plurality of physical access control readers for use of the at least one of the notification, device tracking information, device status information, or reader update by each of the two or more of the plurality of physical access control readers; and
    communicating, to at least one of the plurality of mobile communication devices, a message corresponding to the exchanging between the two or more of the plurality of physical access control readers.

2. The method of claim 1, further comprising receiving authentication information at one or more of the plurality of mobile communication devices from the one or more servers through the mobile communication network.

3. The method of claim 1, wherein the first communication protocol comprises at least one of a Wiegand, RS485, RS232, TCP/IP, Ethernet, or PoE protocol.

4. The method of claim 1, wherein the proximity-based communication protocol comprises a Bluetooth Low Energy (BLE) protocol.

5. The method of claim 4, wherein the second communication protocol comprises the WiFi communication protocol.

6. The method of claim 1, wherein the second communication protocol comprises the WiFi communication protocol.

7. A method for an access control system, the method comprising:
    forming a wired network that enables communication between a plurality of physical access control readers and at least one access control panel utilizing a first communication protocol, the at least one access control panel assisting the plurality of physical access control readers in making access control decisions,
    forming, in response to determining a triggering event has occurred, connections to a second network that enables communication between the plurality of physical access control readers using a WiFi communication protocol;
    enabling communication between the plurality of physical access control readers and a plurality of mobile communication devices using a proximity-based communication protocol;
    enabling communication between the plurality of mobile communication devices and one or more servers, separate from the at least one access control panel, using a second communication protocol;
    communicating, wirelessly using the WiFi communication protocol, at least one of a notification, device tracking information, device status information, or a reader update between two or more of the plurality of physical access control readers and the one or more servers for use of the at least one of the notification, device tracking information, device status information, or reader update by the one or more servers; and
    communicating, to at least one of the plurality of mobile communication devices, a message corresponding to the communicating between the two or more of the plurality of physical access control readers and the one or more servers.

8. The method of claim 7, further comprising receiving authentication information at one or more of the plurality of mobile communication devices from the one or more servers through the mobile communication network.

9. The method of claim 7, wherein the proximity-based communication protocol comprises a Bluetooth Low Energy (BLE) protocol.

10. The method of claim 7, wherein the second communication protocol comprises the WiFi communication protocol.

11. The method of claim 9, wherein the second communication protocol comprises the WiFi communication protocol.

12. The method of claim 11, wherein the first communication protocol comprises at least one of a Wiegand, RS485, RS232, TCP/IP, Ethernet, or PoE protocol.

13. A non-transitory computer-readable medium storing instructions that, when executed by at least one processor, cause the at least one processor to:
   form a wired network that enables communication between a plurality of physical access control readers and at least one access control panel utilizing a first communication protocol, wherein the at least one access control panel assists the plurality of physical access control readers in making access control decisions;
   form, in response to determining a triggering event has occurred, connections to a second network that enables communication between the plurality of physical access control readers using a WiFi communication protocol;
   enable communication between the plurality of physical access control readers and a plurality of mobile communication devices using a proximity-based communication protocol;
   enable communication between the plurality of mobile communication devices and one or more servers, separate from the at least one access control panel, using a second communication protocol;
   exchange, wirelessly using at least one of the WiFi communication protocol or the proximity-based communication protocol, at least one of a notification, device tracking information, device status information, or a reader update between two or more of the plurality of physical access control readers for use of the at least one of the notification, device tracking information, device status information, or reader update by each of the two or more of the plurality of physical access control readers; and
   communicate, to at least one of the plurality of mobile communication devices, a message corresponding to the exchange between the two or more of the plurality of physical access control readers.

14. The computer-readable medium of claim 13, wherein the instructions, when executed by the at least one processor, further cause the at least one processor to receive authentication information at one or more of the plurality of mobile communication devices from the one or more servers through the mobile communication network.

15. The computer-readable medium of claim 13, wherein the proximity-based communication protocol comprises a Bluetooth Low Energy (BLE) protocol.

16. The computer-readable medium of claim 15, wherein the second communication protocol comprises the WiFi communication protocol.

17. The computer-readable medium of claim 16, wherein the first communication protocol comprises at least one of a Wiegand, RS485, RS232, TCP/IP, Ethernet, or PoE protocol.

18. The computer-readable medium of claim 13, wherein the second communication protocol comprises the WiFi communication protocol.

19. A non-transitory computer-readable medium storing instructions that, when executed by at least one processor, cause the at least one processor to:
   form a wired network that enables communication between a plurality of physical access control readers and at least one access control panel utilizing a first communication protocol, wherein the at least one access control panel assists the plurality of physical access control readers in making access control decisions;
   form, in response to determining a triggering event has occurred, connections to a second network that enables communication between the plurality of physical access control readers using a WiFi communication protocol;
   enable communication between the plurality of physical access control readers and a plurality of mobile communication devices using a proximity-based communication protocol;
   enable communication between the plurality of mobile communication devices and one or more servers, separate from the at least one access control panel, using a second communication protocol;
   communicate, wirelessly using the WiFi communication protocol, at least one of a notification, device tracking information, device status information, or a reader update between two or more of the plurality of physical access control readers and the one or more servers for use of the at least one of the notification, device tracking information, device status information, or reader update by the one or more servers; and
   communicate, to at least one of the plurality of mobile communication devices, a message corresponding to the communicating between the two or more of the plurality of physical access control readers and the one or more servers.

20. The computer-readable medium of claim 19, wherein the instructions, when executed by the at least one processor, further cause the at least one processor to receive authentication information at one or more of the plurality of mobile communication devices from the one or more servers through the mobile communication network.

21. The method of claim 19, wherein the first communication protocol comprises at least one of a Wiegand, RS485, RS232, TCP/IP, Ethernet, or PoE protocol.

22. The method of claim 19, wherein the proximity-based communication protocol comprises a Bluetooth Low Energy (BLE) protocol.

23. The method of claim 22, wherein the second communication protocol comprises the WiFi communication protocol.

24. The method of claim 19, wherein the second communication protocol comprises the WiFi communication protocol.

* * * * *